(No Model.)
C. SACCO.
KNEADING MACHINE.
No. 445,204. Patented Jan. 27, 1891.
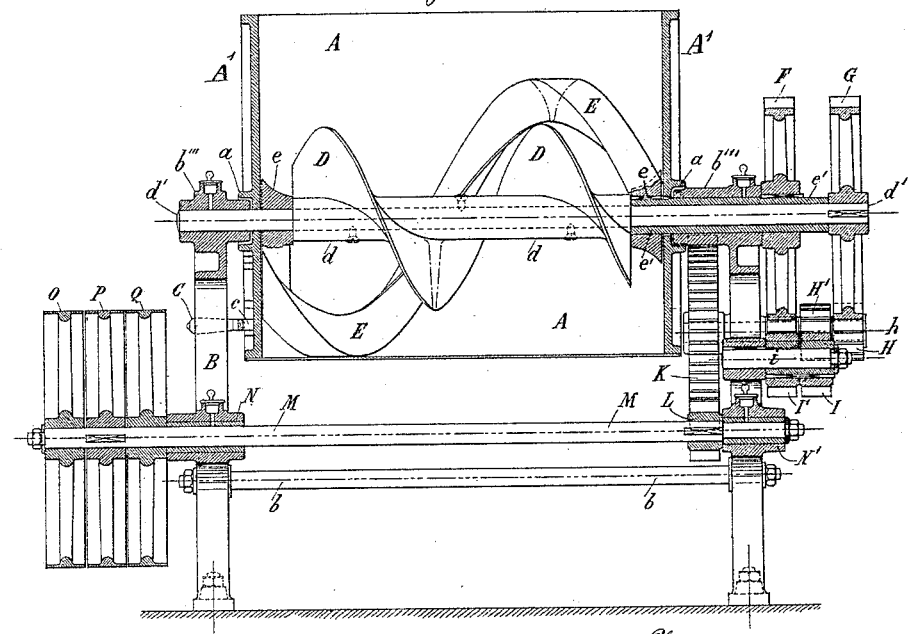
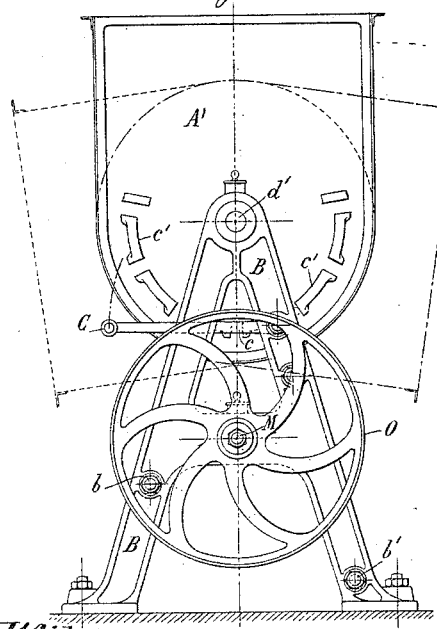
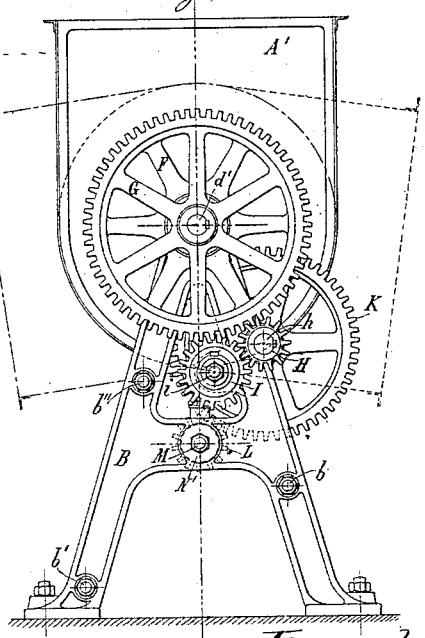
Witnesses.
Chas. W. Conboye.
B. W. Sommers
Inventor
Carlo Sacco

UNITED STATES PATENT OFFICE.

CARLO SACCO, OF GENOA, ITALY.

KNEADING-MACHINE.

SPECIFICATION forming part of Letters Patent No. 445,204, dated January 27, 1891.

Application filed September 1, 1890. Serial No. 363,640. (No model.)

*To all whom it may concern:*

Be it known that I, CARLO SACCO, a subject of the King of Italy, residing at Genoa, in the Kingdom of Italy, have invented certain new and useful Improvements in Kneading-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to kneading-machines, and more particularly to machines for kneading bread and similar doughs, and has for its object to provide means for more effectually and intimately combining the materials employed and for more effectually aerating the dough in order to obtain a light final product.

The invention consists, essentially, in the combination of two coaxial helices adapted to revolve one within the other in the same or in opposite directions; also in the construction and combination with the helices of a tilting trough, and in other structural features and combinations of parts as will now be fully described, reference being had to the accompanying drawings, in which—

Figure 1 is a longitudinal vertical section of a kneading-machine embodying my invention, and Figs. 2 and 3 are opposite end elevations thereof.

The machine is composed of two standards or cheeks B B, firmly braced together by rods $b$ $b'$ and $b''$. At the upper end of each cheek B is formed a bearing $b'''$ for the shaft $d'$, on which the kneading-helices are mounted. As shown in Fig. 1, the bearings $b'''$ are provided with a hub or nave forming a bearing for the tubular hub $a$ of the kneading trough or vessel A, which is thus free to revolve on the cheek-bearings. The body of the kneading-trough A is preferably constructed of sheet metal and secured to cast-metal heads A', one of which is provided with a number of projections or ribs $c'$, Fig. 2, equidistant from one another, the spaces between said projections or ribs serving to lock the trough A into its normal or vertical position or into a horizontal position to one or the other side of its axis of rotation, or to any position intermediate of these extreme positions determined by the number of ribs and interspaces in the head thereof. The trough is locked into any of these positions by means of a lever C, fulcrumed to one of the cheeks B, and provided with a tooth $c$, Fig. 2, adapted to enter a space between two of the ribs $c'$ on one of the heads A' of said trough.

E is the outer helix, which is V-shaped or substantially triangular in cross-section, and is provided at its ends with radial arms terminating in a sleeve-bearing $e$. The inner coaxial helix D is formed on a sleeve $d$, that is rigidly secured to shaft $d'$ in any suitable manner, as by key or feather, or by means of set-screws, as shown in Fig. 1.

One of the bearings $e$ of the outer helix E is loosely mounted on shaft $d'$, the other bearing being keyed or otherwise secured to a sleeve $e'$ on said shaft $d'$, and to the outer end of said sleeve is keyed a gear-wheel F, a like wheel G being keyed to shaft $d'$. The last-named gear-wheel G gears with a pinion H on a counter-shaft $h$, which also carries a pinion H' and a power-transmitting wheel K. The pinion H' is in gear with a pinion I on a short shaft or pivot $i$, which also carries a pinion I' in gear with the wheel F on sleeve $e'$, said pinions I and I' revolving freely on the short shaft $i$. From the description of the driving-gear it will readily be seen that both wheels F and G receive their motion from the wheel K, and that said wheels F and G revolve in opposite directions, and in practice the pinions H and H', as well as the pinions I and I', may be cast in one piece, there being practically but two pinions.

The transmitting-wheel K receives motion from the driving-shaft M through pinion L, and the said driving-shaft carries two loose pulleys O Q and an intermediate fast pulley P, and is connected with the prime motor by a straight and crossed belt, which I have deemed unnecesary to show, so that the rotation of the shaft $d'$ and sleeve $e'$ may be reversed.

As shown in Fig. 1, the radii of the thread of the outer helix E are but slightly greater than the radii of the thread of the inner helix D, while the radii of the thread of the outer helix E are but slightly less than the radius of the semi-cylindrical bottom of the trough A. The outer face of the outer helix is a substantially flat surface, which acts to squeeze out and flatten the dough between it and the bottom of the trough, while its inner sharp or knife edge co-operates with the like outer edge of the inner helix to cut the dough between them.

The helices are curved in the same direction, but their thread is not of the same pitch, the relative arrangement of the pitch of the threads of the two helices being preferably such that the inner helix will make one and a half revolution, while the outer helix will make a little less than one revolution on the shaft-length during the same time. In this manner the dough drawn along and between the helices is alternately drawn out and cut up, while a portion of the dough is subjected to a squeezing process as it is carried between the outer flat face of the outer helix and the walls of the trough.

Although I prefer to revolve the two helices in opposite directions, I do not desire to limit myself thereto, as it is obvious that for some kinds of dough or for effecting the initial admixture of ingredients the helices may be revolved in the same direction, while the speed thereof may be varied.

By providing means for reversing the direction of rotation of the helices a more intimate admixture of the ingredients is obtained.

Having thus described my invention, what I claim is—

1. In a dough-kneading machine, the combination, with the kneading-trough, of two coaxial helices adapted to revolve one within the other and having their operative faces in such proximity as to knead or cut the dough between them, substantially as and for the purposes set forth.

2. In a dough-kneading machine, the combination, with the kneading-trough, of two revoluble coaxial helices having threads of different pitch, substantially as and for the purposes set forth.

3. In a dough-kneading machine, the combination, with the kneading-trough, of two helices, arranged one within the other and having threads of like direction, said helices being adapted to revolve in reverse directions, substantially as and for the purposes set forth.

4. In a dough-kneading machine, the combination, with the kneading-trough, of two coaxial revoluble helices, the outer helix having a thread of substantially a V shape in cross-section and arranged to revolve with its broad face in proximity to the inner face of the trough, for the purposes set forth.

5. In a dough-kneading machine, the combination, with the kneading-trough provided with a semi-cylindrical bottom, of two coaxial revoluble helices, the threads of which run in like directions, the radii of the threads of the outer helix being slightly greater than the radii of the inner helix and slightly less than the radius of the bottom of the kneading-trough, substantially as and for the purposes set forth.

6. In a dough-kneading machine, the combination, with the kneading-trough provided with a semi-cylindrical bottom, of two coaxial helices, the outer one of which has a thread of a substantially triangular form in cross-section and arranged to present the sharp edge of the thread to the corresponding edge of the thread of the inner helix, substantially as and for the purposes set forth.

7. In a dough-kneading machine, a reversible kneading-trough provided with a semi-cylindrical bottom and means for locking said trough against revolution, in combination with coaxial helices and a driving-gear adapted to revolve said helices within the trough in reverse directions, substantially as and for the purposes set forth.

In witness whereof I have hereunto set my hand and affixed my seal this 9th day of August, A. D. 1890.

CARLO SACCO. [L. S.]

Witnesses:
GIUSEPPE CIOCCA,
SECONDO TORTA.